(12) United States Patent
Sanji et al.

(10) Patent No.: US 7,834,715 B2
(45) Date of Patent: Nov. 16, 2010

(54) CIRCUIT SYSTEM

(75) Inventors: Kenichiro Sanji, Nishio (JP); Noboru Maeda, Chiryu (JP); Youichirou Suzuki, Nishio (JP); Hisanori Miura, Gamagori (JP); Nobuyuki Iwasaki, Nishio (JP)

(73) Assignees: Denso Corporation, Kariya (JP); Nippon Soken, Inc., Nishio (JP)

( * ) Notice: Subject to any disclaimer, the term of this patent is extended or adjusted under 35 U.S.C. 154(b) by 788 days.

(21) Appl. No.: 11/711,912

(22) Filed: Feb. 27, 2007

(65) Prior Publication Data

US 2007/0262788 A1 Nov. 15, 2007

(30) Foreign Application Priority Data

Feb. 28, 2006 (JP) .............................. 2006-052245
Jan. 18, 2007 (JP) .............................. 2007-009221

(51) Int. Cl.
*H01P 5/02* (2006.01)
(52) U.S. Cl. ............................... 333/24 R; 333/4; 333/5
(58) Field of Classification Search ...................... 333/4, 333/5, 24 R
See application file for complete search history.

(56) References Cited

U.S. PATENT DOCUMENTS 5,126,707 A * 6/1992 Ikeda .......................... 333/185
6,995,629 B2 2/2006 Nishimura
7,145,411 B1 * 12/2006 Blair et al. ...................... 333/5
2006/0066417 A1 * 3/2006 Yamanaga et al. ............ 333/33

FOREIGN PATENT DOCUMENTS

| JP | 11-162265 | 6/1999 |
| JP | 2001-007458 | 1/2001 |
| JP | 2002-354053 | 12/2002 |
| JP | 2003-018224 | 1/2003 |
| JP | 2004-096351 | 3/2004 |
| JP | 2006-100384 | 4/2006 |

* cited by examiner

*Primary Examiner*—Benny Lee
*Assistant Examiner*—Gerald Stevens
(74) *Attorney, Agent, or Firm*—Harness, Dickey & Pierce, PLC

(57) ABSTRACT

A circuit system includes: a master node; and a slave portion including a plurality of non-grounded slave nodes, each of which couples with the master node through a pair of communication lines. The master node and the slave portion provide a differential transmission system for differentially transmitting a signal among the master node and the slave nodes. The slave portion has a predetermined impedance. The differential transmission system has a good signal condition and a sufficient low common mode noise.

12 Claims, 9 Drawing Sheets

CIRCUIT SYSTEM

CROSS REFERENCE TO RELATED APPLICATIONS

This application is based on Japanese Patent Applications No. 2006-52245 filed on Feb. 28, 2006, and No. 2007-9221 filed on Jan. 18, 2007, the disclosures of which are incorporated herein by reference.

FIELD OF THE INVENTION

The present invention relates to a circuit system.

BACKGROUND OF THE INVENTION

Conventionally, in a differential transmission system for transmitting a synchronized signal through a pair of communication lines, a magnetic flux generated by a normal mode current is canceled. Thus, a normal mode noise is reduced, so that a noise in the communication lines is mainly a common mode noise generated between the lines and a ground. Here, the common mode noise is determined by a common mode impedance. In a slave node connecting to a master node through a pair of communication lines for communicating with a differential transmission system, the common mode impedance is defined by grounding to a conductive ground plate. Thus, the common mode noise is reduced. This is disclosed in, for example, JP-A-2002-354053, JP-A-2003-18224 and JP-A-2004-96351. For example, in JP-A-2004-96351, a terminal circuit in a differential transmission line provides a center tap terminal circuit for adjusting a differential mode and a common mode to the differential transmission line. The center tap terminal circuit includes a resister and a capacitor, and is connected in series with an input terminal of a receiving side IC.

A passenger protection device control system operates a passenger protection device such as an air bag system and a seatbelt pre-tensioner when a vehicle collides. In the control system, an ECU as a master node is coupled with various sensors and a starting device as a slave node through a pair of communication lines, respectively. The sensors are, for example, a collision sensor and a passenger-detecting sensor. The starting device is an air bag squib as an igniting device for operating the airbag.

In the conventional passenger protection device control system, it is necessary to maintain reliability of communication between the master node and the slave node even when a part of the communication lines is broken by the vehicle collision. Thus, each sensor functions as a non-grounded slave node, which is not grounded to a body earth such as a vehicle body. Accordingly, the common mode impedance of each sensor is not defined so that the common mode noise is reduced.

Thus, it is required for a circuit system functioning as a non-grounded slave node in a differential transmission system to reduce a common mode noise.

SUMMARY OF THE INVENTION

In view of the above-described problem, it is an object of the present disclosure to provide a circuit system.

According to an aspect of the present disclosure, a circuit system includes: a master node; and a slave portion including a plurality of non-grounded slave nodes, each of which couples with the master node through a pair of communication lines. The master node and the slave portion provide a differential transmission system for differentially transmitting a signal among the master node and the slave nodes. The slave portion has a predetermined impedance.

In the above circuit system, the predetermined impedance of the slave portion includes a predetermined common mode impedance, which provides to reduce a noise in the differential transmission system, and a predetermined differential mode impedance, which provides a sufficient communication condition. Thus, the differential transmission system has a good signal condition and a sufficient low common mode noise.

Alternatively, each slave node may include: a substrate having an electric element for the differential transmission system; a casing disposed between the substrate and a conductive ground plate, wherein the circuit system is mounted on the conductive ground plate; a first fixation member for mounting the substrate on the casing; and a second fixation member for mounting the casing on the ground plate. A structure and/or a thickness of the substrate, a material and/or a thickness of the casing, a material and/or a structure of the first fixation member or a material and/or a structure of the second fixation member are adjusted to be a predetermined value so that a common mode impedance between each communication line and the ground plate is set to be a predetermined impedance. In this case, the common mode noise is sufficiently reduced with suppressing fluctuation of a center voltage in a differential voltage and a center current in a differential current. Further, the circuit system is manufactured with low cost.

Further, the casing may have an impedance defined as Zcase, a capacitance defined as Ccase, a relative permittivity defined as $\epsilon_{r1}$, and a thickness defined as D. The signal in the differential transmission system includes a noise having an angular frequency defined as $\omega$ and a frequency defined as f. The substrate has a conductive area of a backside thereof defined as S. A dielectric constant of vacuum is defined as $\epsilon_0$. The circuit system has a relationship of $$Zcase = \frac{1}{\omega Ccase} = \frac{1}{2\pi f \cdot \epsilon_0 \epsilon_{r1} \cdot \frac{S}{D}}.$$

Alternatively, the circuit system may further include an additional circuit for setting a frequency characteristic of the impedance of the slave portion. Each communication line has one terminal disposed on a slave node side, and the additional circuit is connected to the one terminal of each communication line. In this case, since the frequency characteristic of the impedance of the slave portion is appropriately determined by the additional circuit, the common mode noise in the system is sufficiently reduced without degrading the signal condition.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

Figure 1:
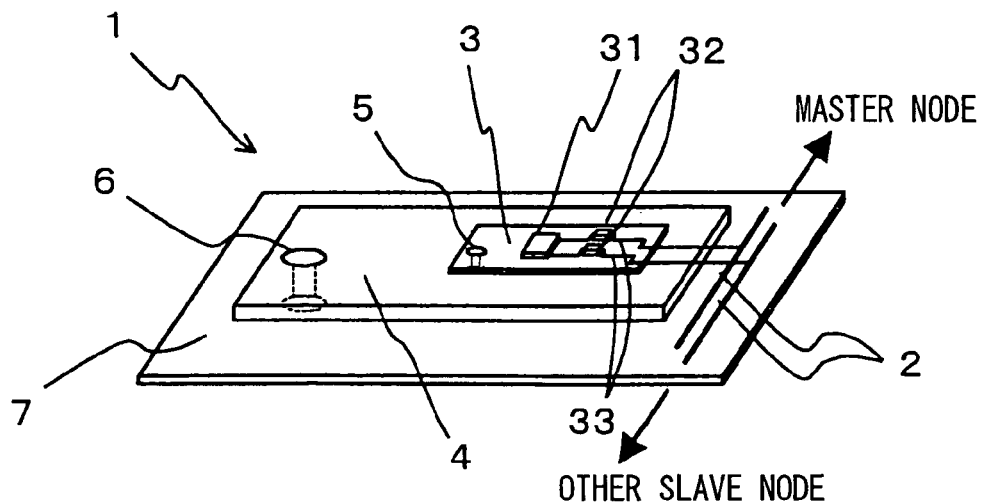
FIG. 1 is a perspective view showing a slave node.

A circuit system as a slave node for a differential transmission system is shown in FIG. 1. The slave node 1 in FIG. 1 is a nongrounded slave node for communicating with a master node by using a differential transmission system. The master node is coupled with a single slave node or multiple slave nodes through a pair of communication lines 2 so that the master node and the slave node 1 provide a network.

The slave node 1 includes a substrate 3, a casing 4, a first fixation member 5 and a second fixation member 6. The slave node 1 is mounted on a ground plate 7 made of conductive material. When the slave node 1 is mounted on a vehicle, the ground plate 7 provides a vehicle body.

The substrate 3 is a single layered or multi-layered board having an electric element such as a communication IC 31, a resistor 32 and a capacitor (not shown), which provides a differential transmission system. The communication IC 31 is connected to the communication lines 2 at a connection portion through a pair of wiring patterns 33.

The casing 4 is disposed between the substrate and the ground plate 7 so that the casing 4 fixes and protects the substrate 3. The casing 4 is made of insulation material and/or conductive material.

The first fixation member 5 is, for example, a screw for fixing the substrate 3 to the casing 4. The first fixation member 5 is made of insulation material and/or conductive material.

The second fixation member 6 is, for example, a screw for fixing the casing 4 to the ground plate 7. The second fixation member 6 is made of insulation material and/or conductive material.

The slave node 1 as the non-grounded slave node is not connected to the ground plate 7 with a low impedance in a direct current manner. The slave node 1 is coupled with the ground plate 7 in an alternating current manner. Alternatively, the slave node 1 may be coupled with the ground plate 7 in a high impedance manner when the slave node 1 is coupled with the ground plate 7 through a capacitor, a high impedance resistor or a floating capacitor in a direct current manner.

Thus, a common mode impedance between the communication line 2 and the ground plate 7 is set to be a predetermined impedance.

Figure 2:
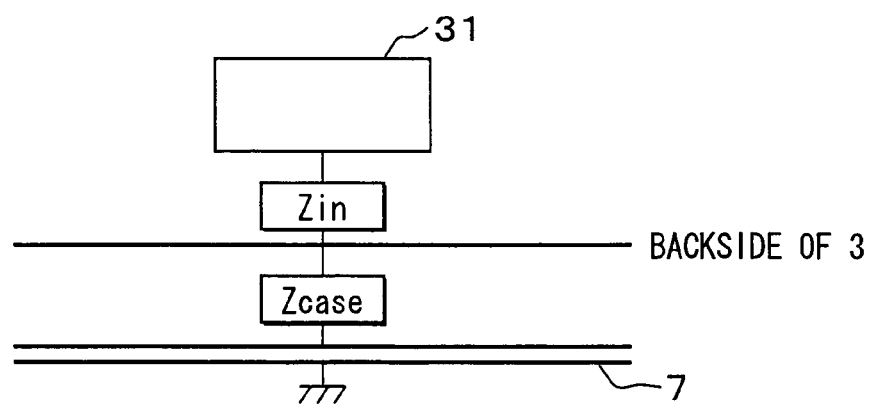
FIG. 2 is a circuit diagram showing an equivalent circuit of the slave node shown in FIG. 1.

Here, FIG. 2 shows an equivalent circuit of the slave node 1. The inner impedance Zin of the substrate 3 has a predetermined frequency characteristic. In the non-grounding type slave node 1, the impedance Zcase of the casing 4 having insulation property is much larger than the inner impedance Zin. For example, when the inner impedance Zin of the slave node 1 is 200Ω, it is required to reduce a space transmission noise having a frequency of 312 MHz, which is suitably used for a keyless entry system or the like. To reduce the space transmission noise, it is considered that the common impedance of the slave node 1 is reduced. Here, the numeral F1 represents a relationship among the impedance Zcase of the casing 4, the capacity Ccase of the casing 4, the angular frequency $\omega$ of the noise, the frequency f of the noise, the dielectric constant $\varepsilon_0$ of vacuum, relative permittivity $\varepsilon_{r1}$, the conductive area S of the backside of the substrate 3 and the thickness D of the casing 4.

$$Zcase = \frac{1}{\omega Ccase} = \frac{1}{2\pi f \cdot \varepsilon_0 \varepsilon_{r1} \cdot \frac{S}{D}} \quad (F1)$$

In the above formula F1, when the casing 4 has the relative permittivity $\varepsilon_{r1}$ of 10, the thickness D of the casing 4 is 3.5 millimeters, the impedance Zcase of the casing 4 can be reduced to 100Ω. Thus, the total impedance of the slave node 1 including the inner impedance Zin can be also reduced.

Specifically, (1) a structure and/or a thickness of the substrate 3, (2) a material and/or a thickness of the casing 4, (3) a material and/or a structure of the first fixation member 5, and (4) a material and/or a structure of the second fixation member 6 are determined so that a floating capacitance generated between the slave node 1 and the ground plate 2 connected each other in an alternating current manner. Thus, the common mode impedance of the slave node 1 is set to be a predetermined impedance.

Figure 3A:
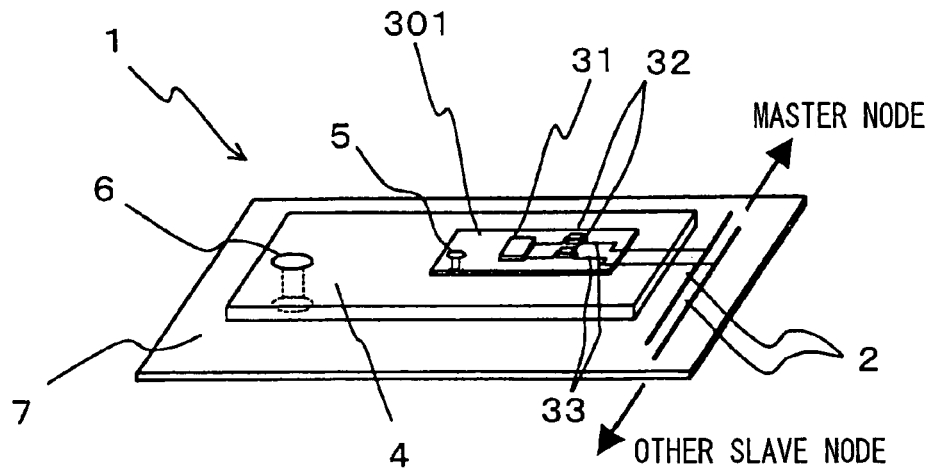
FIGS. 3A to 3C are perspective views showing various substrates in the slave node.
Figure 3B:
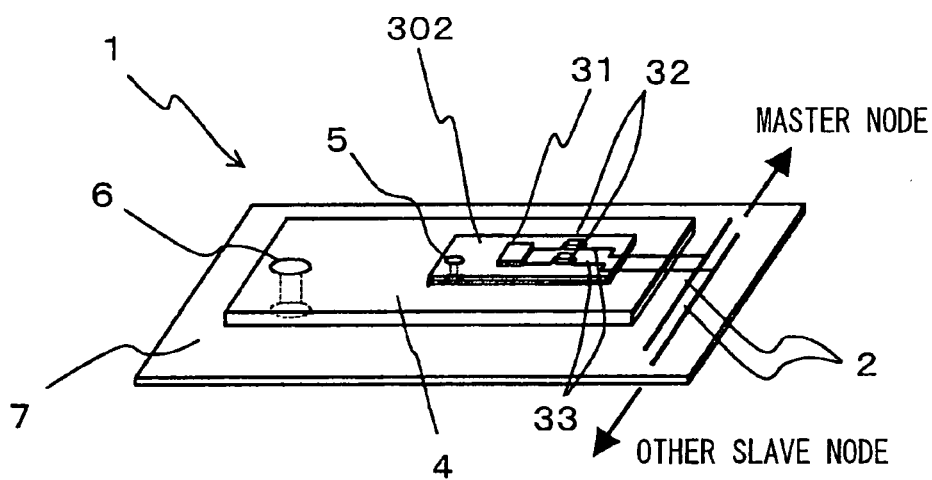
Figure 3C:
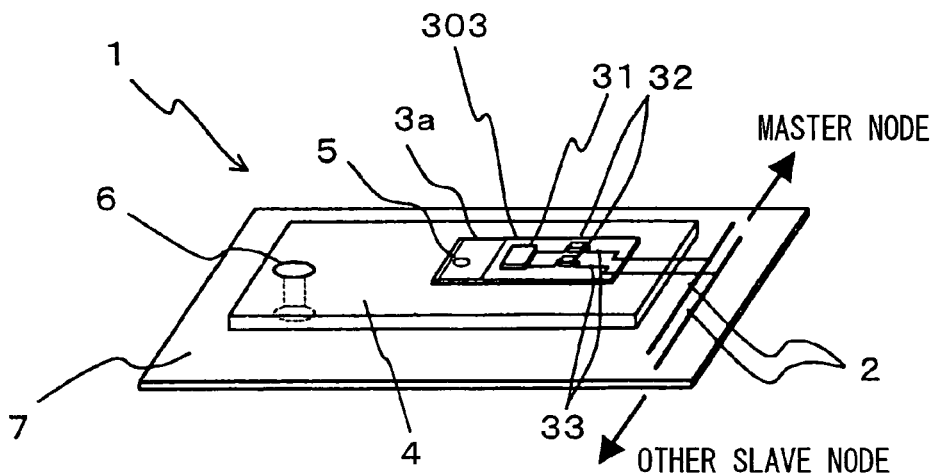

(1) Regarding the structure and/or the thickness of the substrate 3, the substrate 3 has one of structures shown in FIGS. 3A to 3C. Specifically, the substrate 3 may be a substrate 301 having no ground layer (i.e., GND layer), a substrate 302 having a ground layer, or a substrate 303 having a ground region 3a without a ground layer.

Figure 4A:
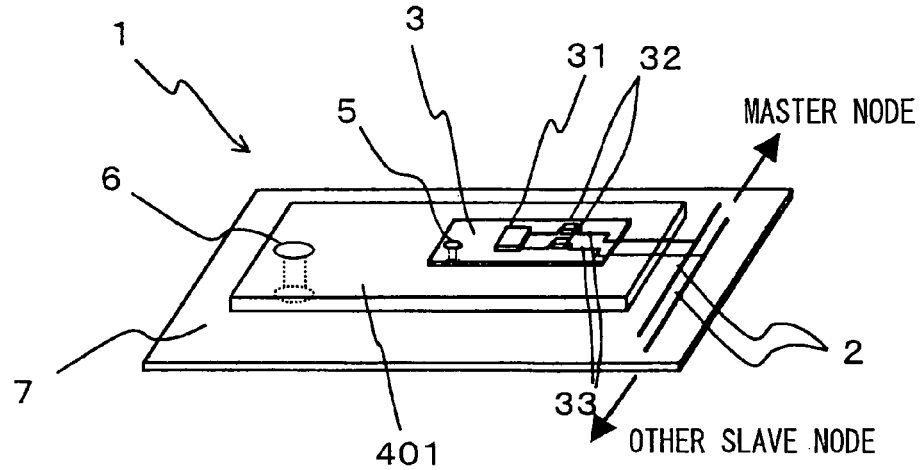
FIGS. 4A to 4C are perspective views showing various casings in the slave node.
Figure 4B:
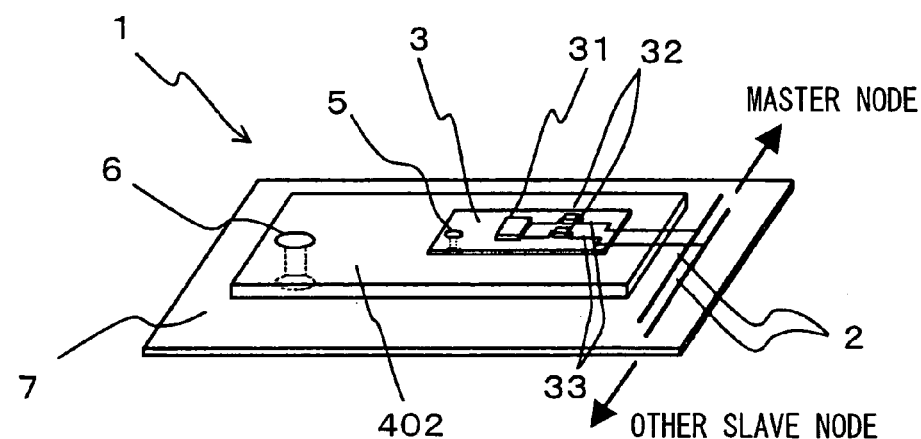
Figure 4C:
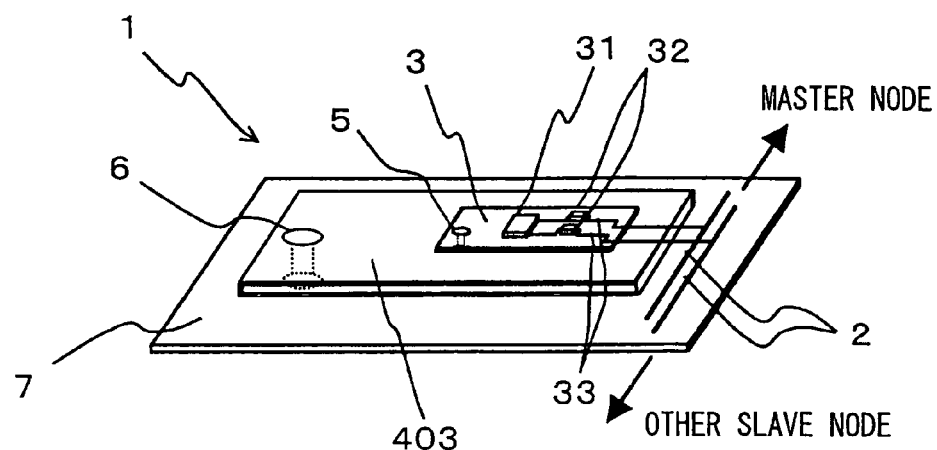

(2) Regarding the material and/or the thickness of the casing 4, the casing 4 has one of structures shown in FIGS. 4A to 4C. Specifically, the casing 4 may be a casing 401 made from a conductive plate, a casing 402 made from an insulation plate, or a casing 403 made from an insulation plate with a conductive coating. When the casing 402 is made from the insulation plate, the thickness of the casing 402 is determined to have a predetermined common mode impedance. When the conductive coating is formed on the insulation plate, the conductive coating may be formed on one side of the insulation plate, or on a whole surface of the insulation plate. When the ground plate 7 is connected to the floating capacitor, a distance to the ground is determined to have a predetermined common mode impedance. Although the casing 4 has a plate shape, the casing 4 may have a box shape.

Figure 5A:
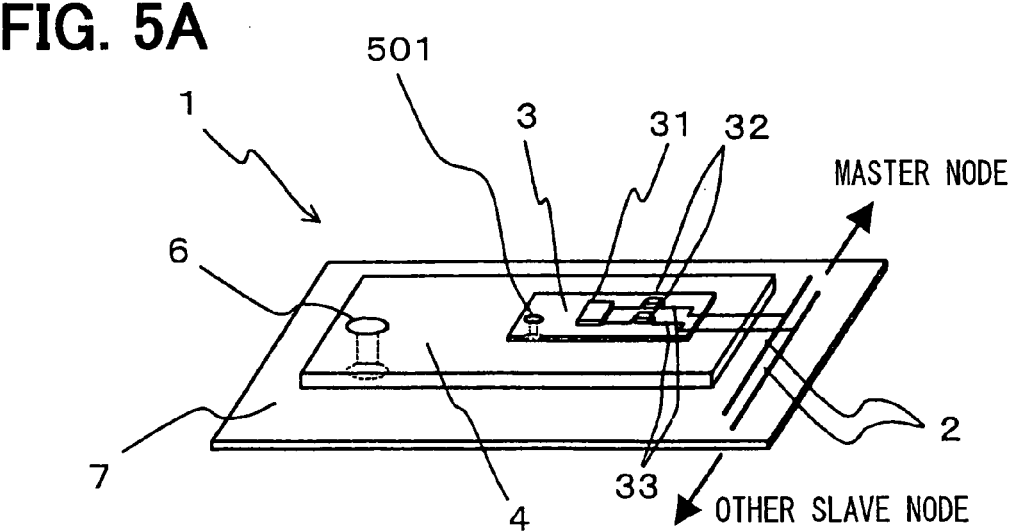
FIGS. 5A to 5C are perspective views showing various first fixation members in the slave node.
Figure 5B:
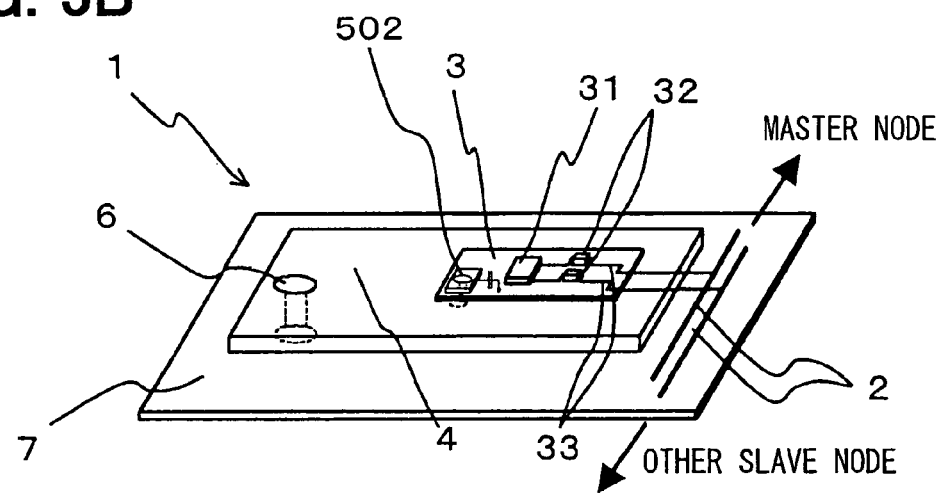
Figure 5C:
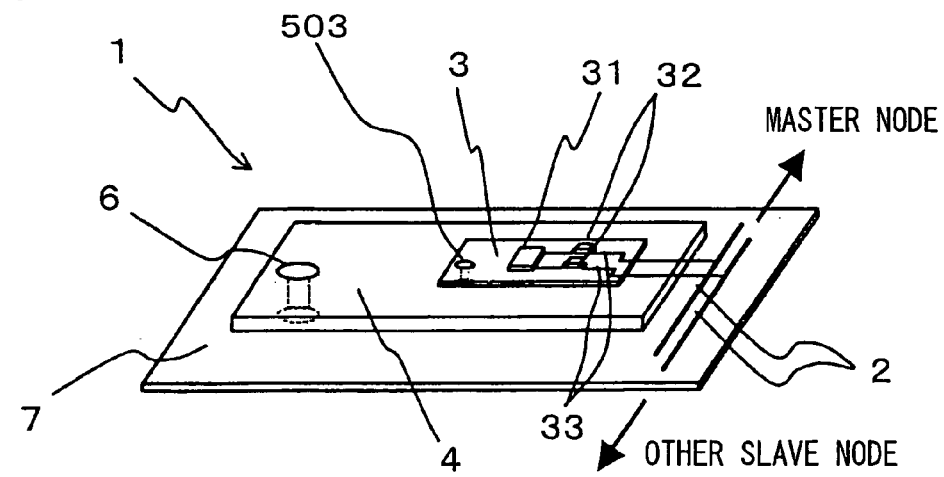

(3) Regarding the material and/or the structure of the first fixation member 5, the first fixation member 5 has one of structures shown in FIGS. 5A to 5C. Specifically, the first fixation member 5 may be a first fixation member 501 having a conductive fixing element, a first fixation member 502 having a conductive fixing element and an electric element such as a capacitor, or a first fixation member 503 having an insulation fixing element.

Figure 6A:
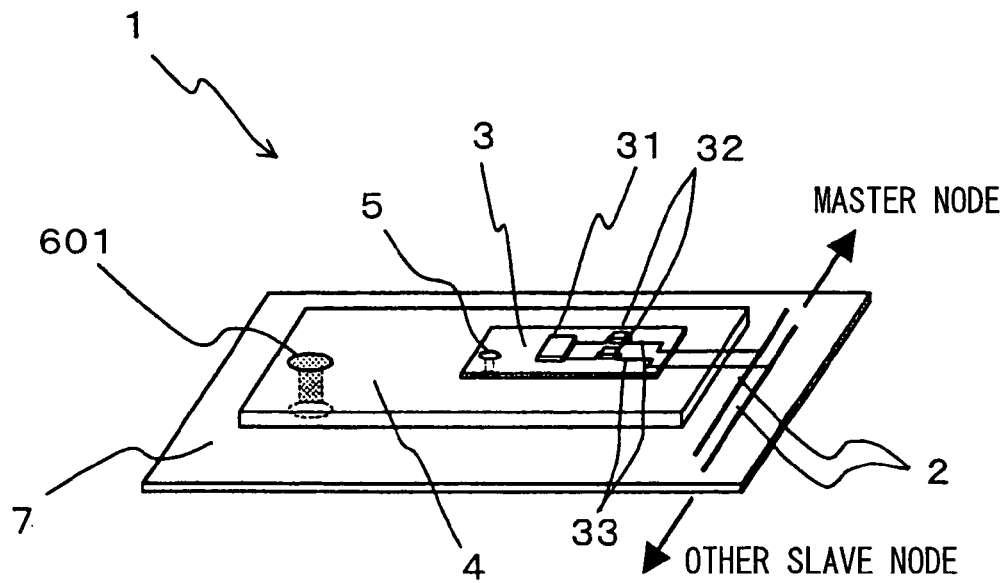
FIGS. 6A to 6B are perspective views showing various second fixation members in the slave node.
Figure 6B:
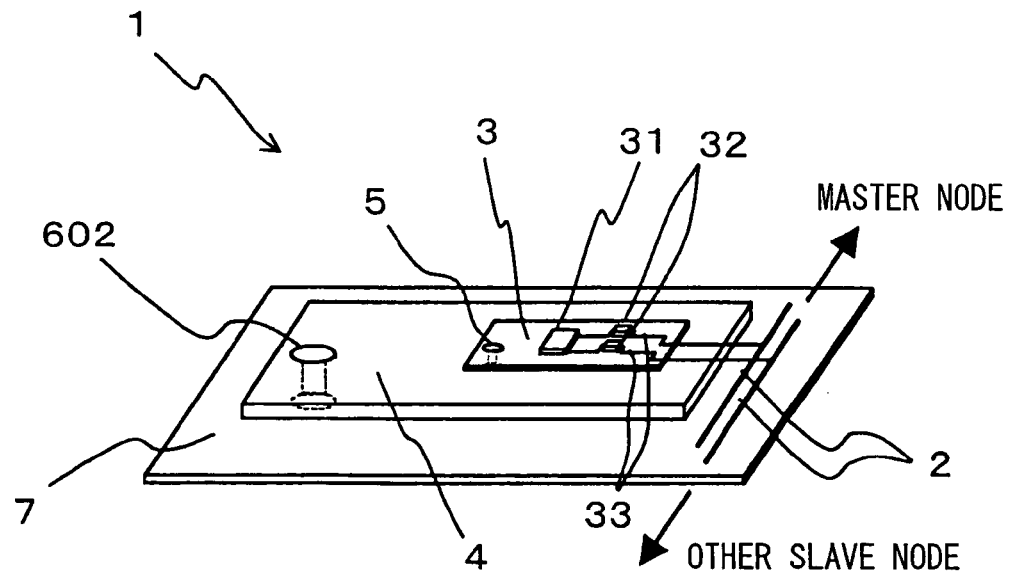

(4) Regarding the material and/or the structure of the second fixation member 6, the second fixation member 6 has one of structures shown in FIGS. 6A to 6B. Specifically, the second fixation member 6 may be a second fixation member 601 having a conductive fixing element, or a second fixation member 602 having an insulation fixing element.

In the slave node 1 having the casing 402, the substrate 301, the first fixation member 503 and the second fixation member 602, each distance among the substrate 301, the casing 402 and the ground plate 7 is determined to have a predetermined floating capacitance connection so that the common mode impedance is adjusted to be a predetermined impedance. Alternatively, a ground region for grounding to the ground plate 7 on the substrate 301 is formed in the wiring pattern of the substrate 301, so that a capacitor connection or a floating capacitor connection is formed.

In a network topology such as a bus type, a tree type and a ring type for a parallel connection, the common mode impedance of each slave node 1 is adjusted to reduce fluctuation of the common mode voltage and/or the common mode current in the communication lines 2. Further, the common mode impedance of the master node is adjusted independently. Thus, the common mode noise in the network introduced from the node or an external circuit to the communication lines 2 is reduced.

In this embodiment, since the total impedance of the slave node is adjusted to a predetermined impedance, the common mode impedance is set to be a predetermined impedance for reducing the noise, and a differential mode impedance is set to be a predetermined impedance for communication. Thus, the common mode noise can be reduced without affecting a communication signal.

Thus, the structure and/or the thickness of the substrate 3, the material and/or the thickness of the casing 4, the material and/or the structure of the first fixation member 5, and the material and/or the structure of the second fixation member 6 are determined so that the common mode impedance between the communication lines 2 and the ground plate 7 is adjusted to be a predetermined impedance. Accordingly, the fluctuation of a central voltage and/or a central current in the differential voltage and the differential current is reduced, so that the common mode noise is reduced with a comparatively low cost and simple construction without any additional element.

Figure 7:
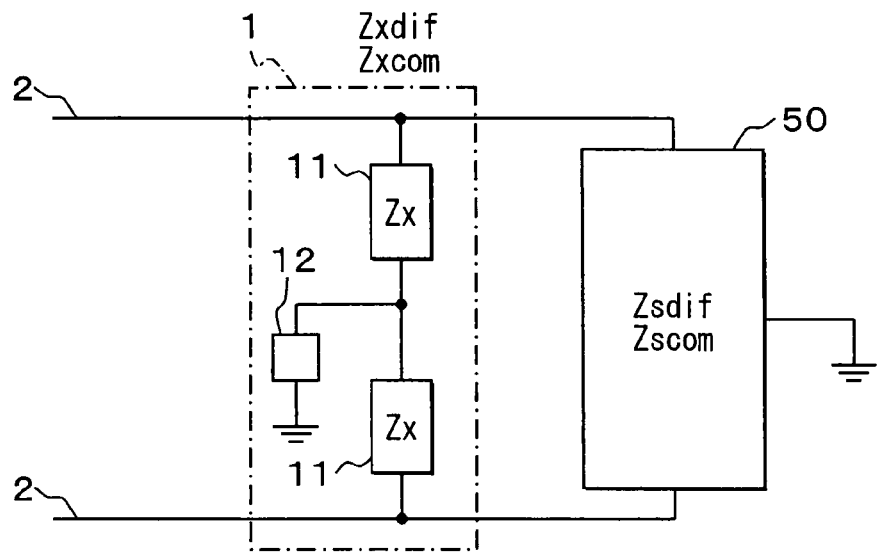
FIG. 7 is a circuit diagram showing the slave portion in the second embodiment.
Figure 8A:
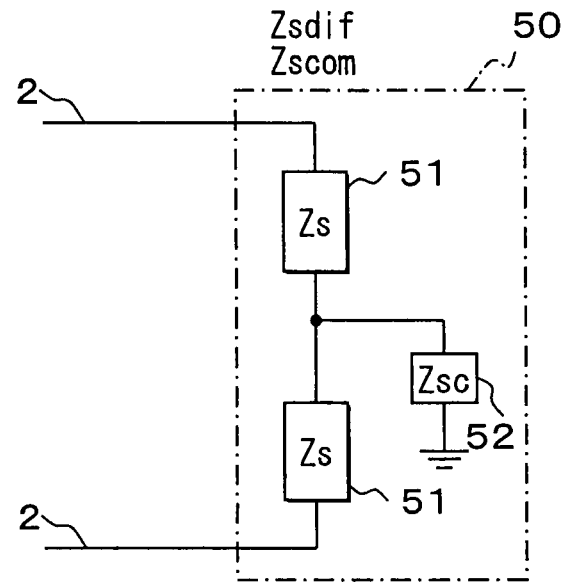
FIG. 8A is a circuit diagram showing an additional circuit.

Next, although the construction and thickness of the substrate 1, the material and the thickness of the casing 4, and the construction and the material of the first fixation member 5 are appropriately determined so that the impedance of the slave node is adjusted in the above embodiment, an additional circuit may be connected so that the frequency characteristic of the total impedance of the slave portion, which includes one ore more slave nodes 1, is determined. FIG. 7 shows a circuit of the slave portion. FIG. 8A shows the additional circuit 50.

The slave node 1 is a non-grounding type slave node for communicating with the master node by using the differential transmission system. FIG. 7 shows an equivalent circuit of the slave portion. Specifically, in the equivalent circuit, two impedance elements 11 having an impedance of Zx are connected in series between a pair of communication lines 2. Further, a floating capacitor 12 having an impedance of Zxc between the slave portion and the ground plate 7 is connected in a middle point between two impedance elements 11. The additional circuit 50 is connected to one terminal of the pair of communication lines 2 on the slave node side.

Figure 8B:
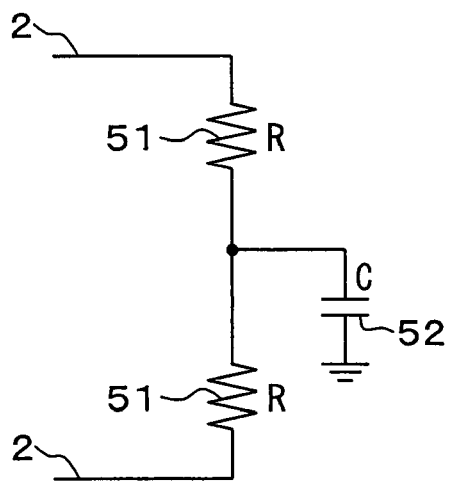
FIG. 8B is a circuit diagram showing one example of the additional circuit.
Figure 8C:
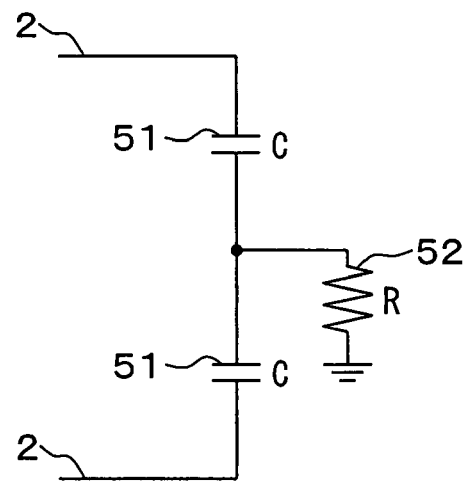
FIG. 8C is a circuit diagram showing another example of the additional circuit.

The additional circuit 50 sets the total impedance of the slave portion including one or more slave nodes 1 to have a predetermined frequency characteristic. In the additional circuit 50, as shown in FIG. 8A, two impedance elements 51 having an impedance of Zs are connected in series between the pair of communication lines 2. Another impedance element 52 having an impedance of Zsc is connected in the middle between two impedance elements 51. The other impedance element 52 is grounded practically. As shown in FIG. 8B, two impedance elements 51 may be two resistors R, and the other impedance element 52 may be a capacitor C. Alternatively, as shown in FIG. 8C, two impedance elements 51 may be two capacitors C, and the other impedance element 52 may be a resistor R.

By connecting the additional circuit 50 to the slave node 1, the differential mode impedance of the slave portion is provided by a parallel connection between the differential mode impedance Zxdif of the slave node 1 and the differential mode impedance Zsdif of the additional circuit 50. To prevent the differential mode impedance of the slave portion at the communication frequency from being reduced, the impedance Zs of each impedance element 51 is set to be much larger than the impedance Zx of each impedance element 11. Here, two impedance elements 51 have almost the same impedance Zs.

The common mode impedance of the slave portion is provided by a parallel connection between the common mode impedance Zxcom of the slave node 1 and the common mode impedance Zscom of the additional circuit 50. When the impedance Zsc of the other impedance element 52 is small, the common mode impedance of the slave portion is reduced. Accordingly, the impedance Zsc of the other impedance element 52 can be determined so that the common mode impedance of the slave portion is equal to or smaller than a predetermined impedance at the noise frequency band. Here, the predetermined impedance is determined based on a target value of reduction of the noise and an output impedance on the master node side. The common mode impedance Zxcom and the differential mode impedance Zxdif of the slave node 1 are calculated from an actual measurement value of S parameter. The impedance characteristic of the slave portion is provided by the differential mode impedance at the communication frequency and the common mode impedance in the noise frequency band (i.e., in an AM band between 0.51 MHz and 1.71 MHz), the differential mode impedance does not affect the communication signal so that the communication signal is not reduced, and the common mode impedance is sufficiently small so that the noise is sufficiently reduced.

Figure 9:
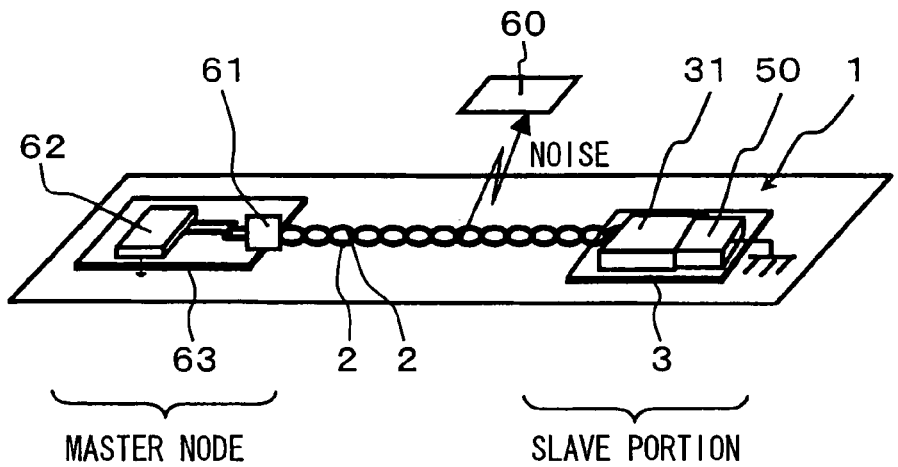
FIG. 9 is a perspective view showing a device having one master node, one slave node and an additional circuit on a slave side substrate.
Figure 10:
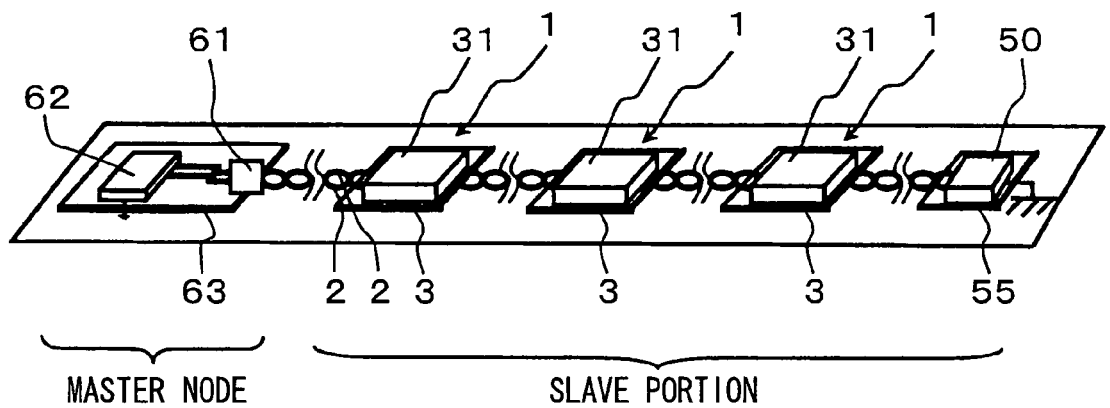
FIG. 10 is a perspective view showing a device having one master node, multiple slave nodes connecting to the master node through a pair of communication lines, and an additional circuit as an independent node.

Next, the connection between the additional circuit 50 and the slave node 1 is explained as follows. FIG. 9 shows an example of the connection, in which one master node and one slave node are formed. The additional circuit 50 is mounted on the substrate 3 on the slave node side. In the differential communication system, the ratio of common mode impedance between the substrate 3 on the slave node side and the master substrate 63 is reduced, so that the common mode noise transmitted in the communication line 2 is reduced. In FIG. 9, to obtain the predetermined ratio of common mode impedance, a common mode filter 61 is inserted in the master substrate 63 so that the common mode impedance of the master substrate 63 is increased. In another example of the connection shown in FIG. 10, the common mode filter 61 is also inserted in the master substrate 63. In FIG. 10, one master node is connected to multiple slave nodes 1 through a pair of communication lines 2. This connection is suitably used for an in-vehicle wiring. The additional circuit 50 is connected to one terminal of the communication line 2 on the slave node side. The additional circuit 50 is mounted on a substrate 55 and provides another node. In FIG. 10, the additional circuit 50 sets the frequency characteristic of the impedance of the slave portion including multiple slave nodes 1 to be a predetermined characteristic.

Thus, the additional circuit 50 connected to the one terminal of the communication lines 2 on the slave node side determines the frequency characteristic of the impedance of the slave portion. The common mode impedance is set to be a predetermined impedance, with which the noise is sufficiently reduced, and the differential mode impedance is set to be a predetermined impedance, with which the communication is sufficiently performed. Accordingly, the common mode noise is reduced without affecting the communication signal.

Specifically, when the slave portion is shown as the equivalent circuit corresponding to the circuit construction of the additional circuit 50, the impedance Zs of each impedance element 51 is set to be much larger than the impedance Zx of a corresponding part of the slave node equivalent circuit. Thus, the differential impedance of the slave portion is prevented from being reduced, and the communication signal is prevented from being affected at the communication frequency. On the other hand, the impedance of the other impedance element 52 is set so that the common mode impedance of the slave portion is equal to or smaller than a predetermined impedance in the noise band. The noise is surely reduced.

The additional circuit 50 is determined such that the differential mode impedance of the additional circuit 50 is much larger than the differential mode impedance of the slave node, and that the common mode impedance of the additional circuit 50 is set in order to reduce the common mode impedance of the slave portion equal to or smaller than a predetermined impedance. Thus, the differential impedance of the slave portion is prevented from being reduced, and the communication signal is prevented from being affected at the communication frequency. Further, the noise is surely reduced.

In the additional circuit 50 shown in FIG. 8, two impedance elements 51 are connected in series between the pair of communication lines 2, and the other impedance element 52 having one terminal substantially grounded is connected at the connection portion among multiple impedance elements 51. Thus, the frequency characteristic of the impedance of the slave portion is surely and appropriately determined with a simple circuit construction.

Figure 11:
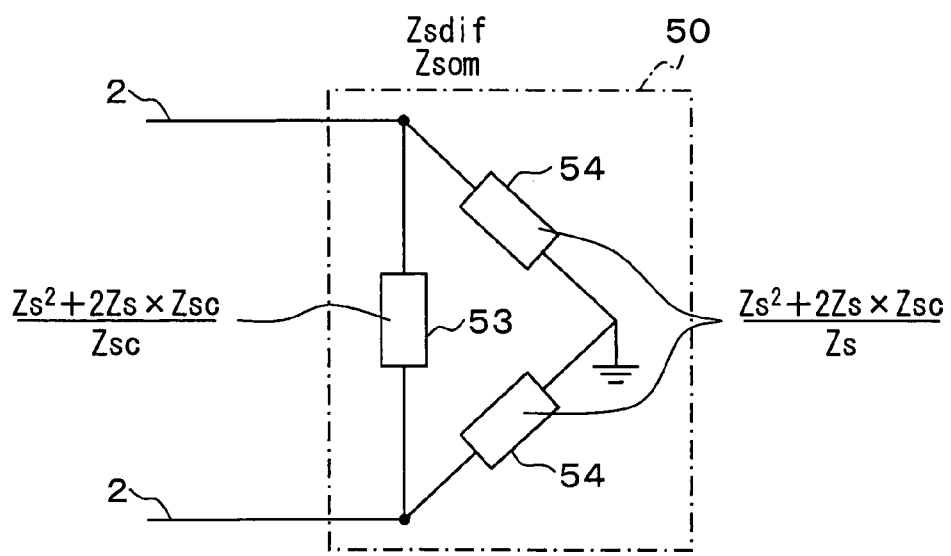
FIG. 11 is a circuit diagram showing another additional circuit.

Although the additional circuit 50 has the construction shown in FIG. 8, the additional circuit 50 may have another construction, for example, shown in FIG. 11. In FIG. 11, the additional circuit 50 includes an impedance element 53 between the pair of communication lines 2 and two impedance elements 54. One terminal of each impedance element 54 is connected to a connection portion between the pair of communication lines 2 and the impedance element 53, and the other terminal of each impedance element 54 is substantially grounded. The impedance of the impedance element 53 is shown as the formula F2 of:

$$\frac{Zs^2 + 2Zs \times Zsc}{Zsc}.$$

The impedance of the impedance element 54 is shown as the formula F3 of:

$$\frac{Zs^2 + 2Zs \times Zsc}{Zs}.$$

In this case, the frequency characteristic of the impedance of the slave portion is surely and appropriately determined with a simple circuit construction.

Figure 12A:
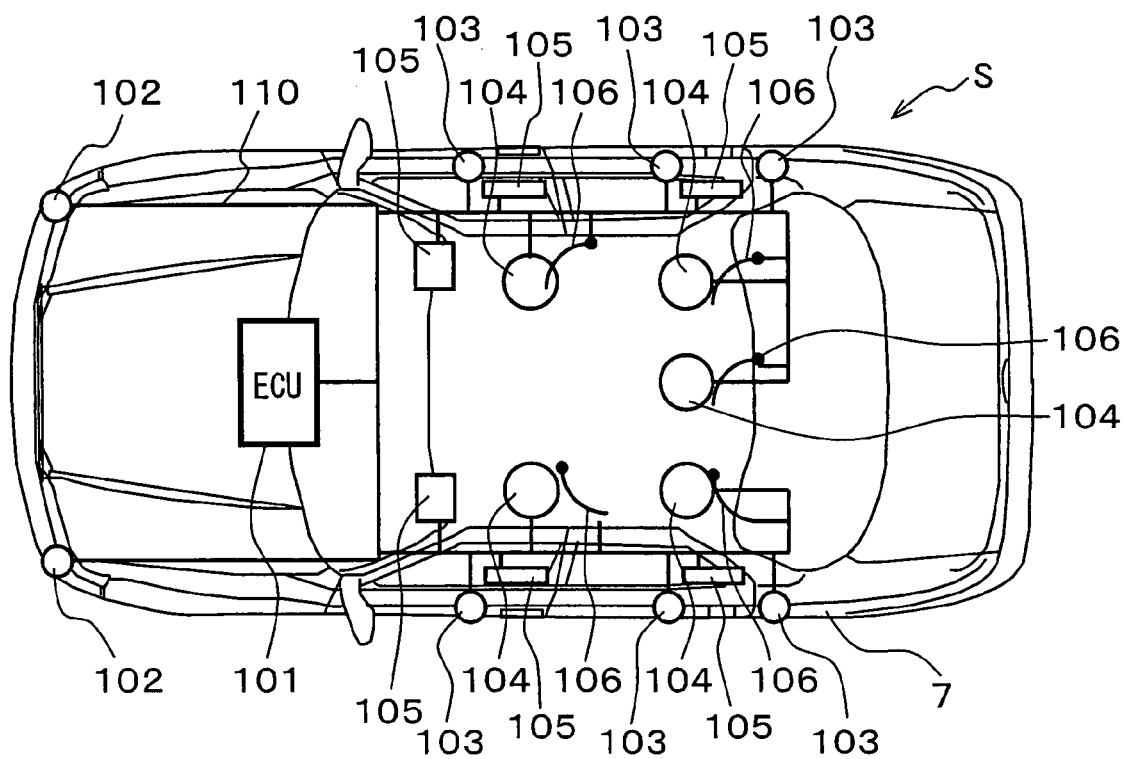
FIG. 12A is a top view showing a passenger protection device control system.
Figure 12B:
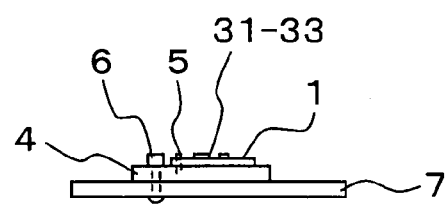
FIG. 12B is a cross sectional view showing the slave node in the control system.

Next, a passenger protection device control system S having the slave node 1 is shown in FIGS. 12A and 12B. The control system S operates a passenger protection device such as an airbag system and a seatbelt pre-tensioner when a vehicle collides. The control system S includes an electric control unit (i.e., ECU) 101 for the passenger protection device. The ECU 101 is connected to a satellite sensor 102 for detecting collision acceleration at a front side of the vehicle, a side collision sensor 103 for detecting side collision of the vehicle, a passenger sensor 104 for detecting existence or non-existence of the passenger in a seat, a squib 105 for the airbag system and a squib 106 for the seatbelt pre-tensioner through a pair of communication lines 110. Here, the side collision sensor 103 is disposed on a side of the vehicle. The ECU 101 communicates with the sensors 102-104 and the squibs 105-106 by using the differential transmission system. In the control system S, the ECU 101 functions as the master node in the differential transmission system. The sensors 102-104 and the squibs 105-106 function as the non-grounded slave node, which is not grounded to the vehicle body.

In the control system S, the structure and/or the thickness of the substrate 1, on which the electric elements 31-33 are mounted, the material and/or the thickness of the casing 4 for protecting the substrate 1 and disposed between the substrate 1 and the vehicle body, the material and/or the structure of the first fixation member 5 for mounting the substrate 1 on the casing 4, and the material and/or the structure of the second fixation member 6 for mounting the casing 4 on the vehicle body as the ground plate 7 are determined appropriately so that a floating capacitor, a capacitance and/or a direct current resistance generated by an alternating current connection between the vehicle body and the slave node such as the sensors 102-104 and the squibs 105-106 are defined. Thus, the common mode impedance between the communication line 110 and the vehicle body is adjusted to be a predetermined impedance, so that the common mode noise to be introduced into the communication line 110 is reduced. Thus, even when the noise in the communication line 110 is transmitted to an antenna, noise generation in a radio or a television is reduced. Further, even when the noise in the communication line 110 is introduced into various devices, reduction of performance of an actuator is prevented. For, example, performance reduction of a brakes, an ETC, an indicator or a power window are improved.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. A circuit system comprising:
   a master node; and a slave portion including a plurality of non-grounded slave nodes, each of which couples with the master node through a pair of communication lines, wherein the master node and the slave portion provide a differential transmission system for differentially transmitting a signal among the master node and the slave nodes, and the slave portion has a first predetermined impedance; wherein each slave node includes:

a substrate having an electric element for the differential transmission system;

a casing disposed between the substrate and a conductive ground plate, wherein the circuit system is mounted on the conductive ground plate;

a first fixation member for mounting the substrate on the casing; and a second fixation member for mounting the casing on the conductive ground plate, a structure and/or a thickness of the substrate, a material and/or a thickness of the casing, a material and/or a structure of the first fixation member or a material and/or a structure of the second fixation member are adjusted to be a predetermined value so that a common mode impedance between each communication line and the conductive ground plate is set to be a second predetermined impedance;

the casing has an impedance defined as Zcase, a capacitance defined as Ccase, a relative permittivity defined as $\in_{r1}$, and a thickness defined as D, the signal in the differential transmission system includes a noise having an angular frequency defined as ω and a frequency defined as f, the substrate has a conductive area of a backside thereof defined as S, a dielectric constant of vacuum is defined as $\in_0$, the circuit system has a relationship of $$Zcase = \frac{1}{\omega Ccase} = \frac{1}{2\pi f \cdot \varepsilon_0 \varepsilon_{r1} \cdot \frac{S}{D}}.$$

2. The circuit system according to claim 1, wherein the substrate is formed of a substrate having no ground layer, a substrate having a ground layer, or a substrate having a ground region without a ground layer.

3. The circuit system according to claim 1, wherein the casing is made of a conductive material, an insulation material, or an insulation material with a conductive coating.

4. The circuit system according to claim 1, wherein the first fixation member is formed of a conductive fixation element, a conductive fixation element connected to the electric element, or an insulation fixation element.

5. The circuit system according to claim 1, wherein the second fixation member is formed of a conductive fixation element or an insulation fixation element.

6. The circuit system according to claim 1, further comprising:

an additional circuit for setting a frequency characteristic of the impedance of the slave portion, wherein each communication line has one terminal disposed on a slave node side, and the additional circuit is connected to the one terminal of each communication line.

7. The circuit system according to claim 6, wherein the additional circuit has a differential mode impedance and a common mode impedance, the differential mode impedance of the additional circuit is larger than a differential mode impedance of the slave node, and the common mode impedance of the additional circuit is determined in such a manner that a common mode impedance of the slave portion is equal to or smaller than a first predetermined impedance.

8. The circuit system according to claim 6, wherein the additional circuit includes a first impedance element and a pair of second impedance elements, the first impedance element is connected to the pair of communication lines, each second impedance element includes one terminal, which is connected to a connection portion between one communication line and the first impedance element, and each second impedance element further includes another terminal, which is substantially grounded.

9. The circuit system according to claim 6, wherein the additional circuit includes a plurality of first impedance elements and a second impedance element, the first impedance elements are connected in series between the pair of communication lines, the second impedance element is connected to a connection portion among the first impedance elements, and the second impedance element is further connected to a ground.

10. The circuit system according to claim 9, wherein the slave portion has an equivalent circuit corresponding to the additional circuit, each first impedance element of the additional circuit has an impedance larger than an impedance of a part of the equivalent circuit of the slave node, the part corresponding to the first impedance element of the additional circuit, and the second impedance element of the additional circuit has an impedance, which is determined in such a manner that the common mode impedance of the slave portion is equal to or smaller than a predetermined impedance in a noise frequency region.

11. The circuit system according to claim 9, wherein the first impedance element is a resistor, and the second impedance element is a capacitor.

12. The circuit system according to claim 9, wherein the first impedance element is a capacitor, and the second impedance element is a resistor.

* * * * *